US006923620B2

(12) United States Patent
Tiemann

(10) Patent No.: US 6,923,620 B2
(45) Date of Patent: Aug. 2, 2005

(54) TURBINE BLADE/VANE AND CASTING SYSTEM FOR MANUFACTURING A TURBINE BLADE/VANE

(75) Inventor: Peter Tiemann, Witten (DE)

(73) Assignee: Siemens Aktiengesellschaft, Munich (DE)

(*) Notice: Subject to any disclaimer, the term of this patent is extended or adjusted under 35 U.S.C. 154(b) by 51 days.

(21) Appl. No.: 10/345,947

(22) Filed: Apr. 30, 2003

(65) Prior Publication Data

US 2005/0111963 A1 May 26, 2005

(30) Foreign Application Priority Data

Jan. 17, 2002 (EP) ............................................ 02001265

(51) Int. Cl.[7] ............................. F01D 9/00; F01D 5/22; B23P 15/02

(52) U.S. Cl. ....................... 415/191; 415/915; 416/192; 29/889.7

(58) Field of Search ................................ 416/181, 189, 416/192, 193 R, 193 A; 415/191, 208.1, 208.2, 115, 178, 915; 29/889.7; 164/122.1, 122.2, 361, 338.1

(56) References Cited

U.S. PATENT DOCUMENTS

| | | | | |
|---|---|---|---|---|
| 2,488,875 A | | 11/1949 | Morley | |
| 3,494,709 A | * | 2/1970 | Piearcey | 416/232 |
| 6,196,799 B1 | * | 3/2001 | Fukue et al. | 416/97 R |
| 6,695,036 B2 | * | 2/2004 | Brandl et al. | 164/516 |

FOREIGN PATENT DOCUMENTS

| | | | | |
|---|---|---|---|---|
| DE | 100 04 714 | | 8/2001 | |
| DE | 100 24 278 | | 11/2001 | |
| EP | 0 357 984 | | 3/1990 | |
| EP | 0 937 863 | | 8/1999 | |
| EP | 1 145 784 | | 10/2001 | |
| WO | 96 13653 | | 5/1996 | |
| WO | WO 9954597 A1 | * | 10/1999 | F01D/5/14 |
| WO | 02 27147 | | 4/2000 | |

* cited by examiner

*Primary Examiner*—Edward K. Look
*Assistant Examiner*—Richard A Edgar
(74) *Attorney, Agent, or Firm*—Harness, Dickey & Pierce, P.L.C.

(57) ABSTRACT

A turbine blade/vane includes a profiled blade/vane aerofoil, which extends along a blade/vane center line. A platform is formed on an end region of the blade/vane aerofoil, extending transverse to the blade/vane center line. This is to be designed for a particularly high capability for carrying thermal and mechanical loading. In addition, the arrangement permits reliable cooling with a comparatively small coolant requirement. For this purpose, the platform includes an outer rim which is thickened in comparison with the platform floor. The side wall of the outer rim facing toward the blade/vane center line is slanted relative to the latter. A casting system suitable for manufacturing the turbine blade/vane includes a first shell element which can be positioned in a casting mold, an essentially flat configuration second shell element being displaceable, while being guided in a direction tilted by an angle of more than 10° and of less than 80°, in the first shell element.

14 Claims, 1 Drawing Sheet

TURBINE BLADE/VANE AND CASTING SYSTEM FOR MANUFACTURING A TURBINE BLADE/VANE

The present application hereby claims priority under 35 U.S.C. §119 on European patent application number 02001265.4 filed Jan. 17, 2002, the entire contents of which are hereby incorporated herein by reference.

FIELD OF THE INVENTION

The invention generally relates to a turbine blade/vane. Preferably, it relates to one having a profiled blade/vane aerofoil, which extends along a blade/vane center line, on which aerofoil is formed, at the end, a platform extending transverse to the blade/vane center line. It generally relates, in addition, to a casting system for manufacturing such a turbine blade/vane.

BACKGROUND OF THE INVENTION

Gas turbines are employed in many fields for driving generators or operational machines. In this case, the energy content of a fuel is used to generate a rotational motion of a turbine shaft. For this purpose, the fuel is burnt in a combustion chamber, compressed air being supplied by an air compressor. The working medium, which is generated in the combustion chamber by the combustion of the fuel and which is at high pressure and high temperature, is then guided via a turbine unit connected downstream of the combustion chamber and expands, while performing work, in this turbine unit.

In order to generate the rotational motion of the turbine shaft, a number of turbine blades are arranged on the turbine shaft. The blades are usually combined into blade groups or blade rows and drive the turbine shaft by use of a transfer of momentum from the flow medium. In order to guide the flow medium within the turbine unit, furthermore, guide vane rows connected to the turbine casing are usually arranged between adjacent rows of rotor blades. In this arrangement, the turbine blades/vanes, in particular the guide vanes, usually have a profiled blade/vane aerofoil extending along a turbine blade/vane center line for the appropriate guidance of the working medium. In order to fasten the turbine blade/vane to the respective support body, a platform extending transverse to the blade/vane aerofoil and embodied as an engagement base is formed at the end of the blade/vane aerofoil.

In order to achieve a particularly favorable efficiency, such gas turbines are, for thermodynamic reasons, usually designed for particularly high outlet temperatures—approximately 1200° C. to approximately 1300° C.—of the working medium flowing out of the combustion chamber and into the turbine unit. With such high temperatures, the components of the gas turbine, in particular the turbine blades/vanes, are exposed to comparatively high thermal loadings. In order to ensure a high degree of reliability and a long life of the respective components, even under such operating conditions, the components affected are usually configured in such a way that they can be cooled.

For this purpose, the turbine blades/vanes are usually embodied as so-called hollow profiles in modern gas turbines. The profiled blade/vane aerofoil has cavities, also designated as blade core, in its interior region for this purpose, in which a coolant can be conducted within these cavities.

Admission of the coolant to the thermally, particularly loaded regions of the respective blade/vane aerofoil is made possible by the coolant ducts formed in this way. In this arrangement, a particularly favorable cooling effect, and therefore a particularly high level of operational reliability, can be achieved by the coolant ducts taking up a comparatively large spatial region within the respective blade/vane aerofoil and by the coolant being conducted as close as possible to the respective surface exposed to the hot gas. In order to ensure an adequate mechanical strength and load-carrying capability in such a configuration, on the other hand, the respective turbine blade/vane can have flow passing through it in a plurality of ducts; such a plurality of cooling ducts, which can be exposed to coolant and are respectively separated from one another by comparatively thin separating walls, is then provided within the blade/vane profile.

Such turbine blades/vanes are usually manufactured by casting. For this purpose, a casting mold, whose contour is matched to the desired blade/vane profile, has wax poured into it in a first casting step. In order to manufacture the flow ducts for the coolant, so-called core elements, in ceramic material for example, are arranged in the casting mold during the casting. After the casting procedure has taken place, these are removed from the wax model for the blade/vane body so that the cavities desired for the coolant ducts appear. The wax model obtained in the first casting step is subsequently provided with a ceramic coating by means of repeated immersion.

As soon as this ceramic coating has a sufficient thickness, if required after a plurality of immersion procedures, the wax model provided with the ceramic coating is burnt out, in which procedure the ceramic is strengthened and the wax is burnt out. By this, a ceramic casting mold for the blade/vane appears in which the core elements for cooling ducts are inter alia also included. In a second casting step, this ceramic casting mold has blade material poured into it. In order to manufacture the wax model, and in particular its blade/vane aerofoil and the structural parts formed on it, such as the platform or an engagement base, appropriately shaped shell elements or slides are arranged in the casting mold for the first casting step. This is done in such a way that, during the casting procedure, a cavity corresponding to the blade/vane shape to be manufactured remains for accepting the wax.

SUMMARY OF THE INVENTION

An embodiment of the invention may be based on an object of providing a turbine blade/vane which is designed for particularly high thermal and mechanical load-carrying capability, on the one hand, and which permits reliable cooling with a comparatively small coolant requirement, on the other. In addition, a casting system suitable for manufacturing the turbine blade/vane may be provided.

With respect to the turbine blade/vane, this object may be achieved, according to an embodiment of the invention, by the platform having an outer rim which is thickened in comparison with the platform floor, the side wall of which outer rim facing toward the blade/vane aerofoil being slanted relative to the blade/vane center line.

An embodiment of the invention may be based on the consideration that for a particularly favorable manufacturing capability, the turbine blade/vane should be of single-crystal design. A turbine blade/vane of the single-crystal type can, namely, be comparatively highly loaded simply on the basis of the material properties. A single-crystal design due, in particular, to the use of shell elements (also designated as slides) is more favorable for the casting operation, in particular because alternatively usable so-called lost inserts would contribute to the germination of polycrystalline material and cannot therefore be used for single-crystal blades/vanes. The contouring of the turbine blade/vane should therefore be designed in such a way that positioning—and after the casting operation, removal—of the shell elements or slides, which are used for the formation of platform depressions, is possible in a comparatively simple manner.

Even with these boundary conditions being maintained, however, the turbine blade/vane should be designed for a comparatively small coolant requirement. This is inter alia achievable by the platform designed for accepting the thermal loading having a comparatively thin-walled design and therefore employing only a small amount of material. This is achievable, even with the specifications mentioned, by a plurality of shell elements being arranged in the casting mold before the casting of the turbine blade/vane, it being possible to introduce a shell element for reducing the platform thickness into the spatial region provided for this reduction in thickness. In order to permit the corresponding forward movement into this spatial region, while also avoiding mold parts arranged above the platform, and also permitting the forward motion into a spatial region particularly close to the blade/vane center, the turbine blade/vane is designed for slanted side walls in the region of the outer ring arranged on the platform.

In order to provide a particularly high mechanical and thermal load-carrying capability for the turbine blade/vane, a functional separation is advantageously undertaken between the component for accepting the mechanical loading, on the one hand, and the component for accepting the thermal loading, on the other. For this purpose, an advantageous design forms an engagement base on the aerofoil of the turbine blade/vane in the end region above the platform. In order, namely, to permit a particularly high thermal loading stability for turbine blades/vanes having reliable mechanical suspension, the platform and the engagement base are advantageously designed to be structurally decoupled from one another in the region of the engagement of the turbine blade/vane. In this arrangement, the platform formed on the blade/vane aerofoil is used exclusively as compensation for the thermal loading due to the hot working medium conducted within the inner space of the gas turbine, no mechanical loading being associated with this arrangement.

For a comparatively small cooling requirement for this component, the platform preferably has a comparatively thin-walled embodiment which is, in particular, made possible because the platform is not exposed to any sort of mechanical loading. In this arrangement, the mechanical loading takes place by means of an engagement base arranged above the platform, which engagement base is suspended in a corresponding structural part on the turbine wall or the turbine shaft. In this arrangement, the engagement base is expediently designed so that it is adequately dimensioned to accept the mechanical loading, any exposure of the engagement base to thermal loading being avoided by use of the platform. The cooling requirement for the engagement base is, in consequence, comparatively small.

The outer rim of the platform can, in particular, have an outer side wall which is made essentially straight with respect to the blade/vane center line, i.e. its cross section is aligned parallel to the blade/vane center line. In such a design, therefore, the outer rim has a comparatively thick embodiment in its region facing toward the platform floor and its cross section narrows steadily toward its end facing away from the platform floor. In order to ensure reliable cooling of all the spatial regions of the outer rim in this case, a special device should be provided for admission to the comparatively thick lower spatial region of the outer rim. For this purpose, the outer rim of the platform is advantageously provided with a number of cooling holes in its floor region. In a further advantageous embodiment and for a particularly simple mode of operation, the outlet ends of the cooling holes are guided, in this arrangement, into a common cooling gap.

The turbine blade/vane can be provided as a rotor blade for a turbine. The turbine blade/vane is, however, advantageously designed as a guide vane for a gas turbine, in particular for a stationary gas turbine.

An object directed toward the casting system for the manufacture of such a turbine blade/vane may be achieved by use of a first shell element, which can be positioned in a casting mold and which has a recess specifying a boundary surface of the platform floor, and in which a second shell element with an essentially plane configuration is guided so that it can be displaced in a direction tilted by an angle of more than 10° and of less than 80°, preferably of less than 60°, relative to the recess specifying the boundary surface.

The interaction between these two shell elements, of which the first shell element can also be designated as a peripheral slide and the second shell element as a pocket slide, makes it possible to manufacture a platform pocket with slanting side walls even without the use of a "lost insert". The casting system is therefore particularly suitable for manufacturing single-crystal turbine blades/vanes because, precisely due to the deliberate avoidance of the use of "lost inserts", any germination of polycrystalline regions is kept particularly slight. In order to manufacture a platform floor with a substantially plane configuration, the second shell element advantageously has, in this arrangement, an end surface tipped relative to its base surface by a matched angle of more than 10° and less than 80°, which end surface forms—jointly with the recess in the first shell element—a casting shell for the platform floor.

The advantages achieved by way of the invention reside, in particular, in the fact that due to the slanted side wall of the platform pocket, which can be manufactured by the second shell element, or the separate slide, seated so that it is slanted in the peripheral direction and is arranged in the first shell element, or the peripheral slide, it is possible to avoid re-entrant interference with the profile rib arrangement for engagement. By this, both shell elements can be removed after completion of the casting procedure and the use of a "lost insert" is therefore unnecessary.

Furthermore, the cooling holes arranged in the outer rim of the platform permit reliable cooling of all the spatial regions of the platform with a comparatively small cooling requirement, it being possible to keep the film cooling area comparatively small. This makes a substantial contribution to the coolant consumption, comparatively small due to the comparatively wide base of the outer rim. Due to the widening of the outer rim in the region of the platform floor, furthermore, the proportion which is comparatively hot during operation of the turbine blade/vane is particularly large in comparison with the colder proportion. The stresses induced in the blade/vane material due to the prevention of thermal expansions are therefore kept comparatively small.

BRIEF DESCRIPTION OF THE DRAWINGS

An exemplary embodiment of the invention is explained in more detail using the drawings below, wherein.

DETAILED DESRIPTION OF THE PREFERRED EMBODIMENTS

Figure 1A:
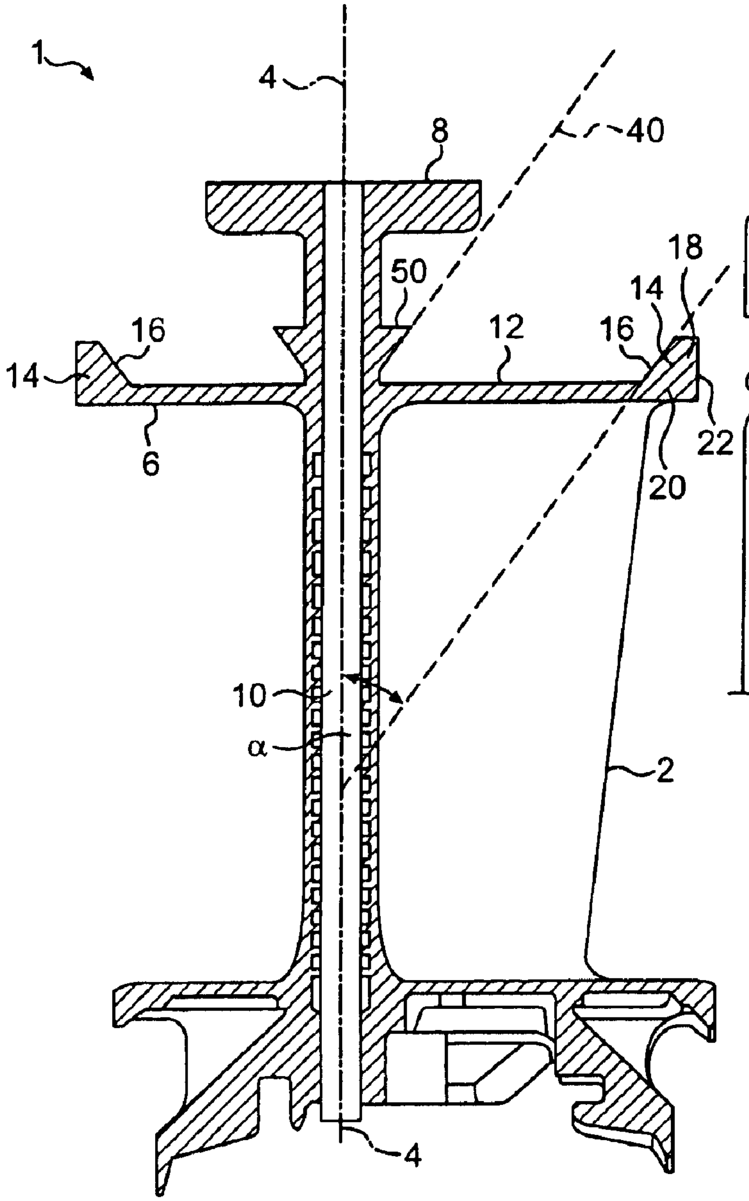
FIG. 1A illustrates a turbine blade/vane in accordance with an exemplary embodiment of the present invention.

The blade/vane 1 in FIG. 1A has a profiled blade/vane aerofoil 2 which extends along a blade/vane center line 4. In this arrangement, the blade/vane aerofoil 2 is domed and/or curved in order to appropriately influence a working medium flowing in an associated turbine unit.

The turbine blade/vane 1 in the exemplary embodiment is configured as a guide vane for a gas turbine; a rotor blade could also, however, be designed according to the fundamentals described below. For this purpose, a platform 6 extending transverse to the blade/vane center line 4 is formed on the upper end of the blade/vane aerofoil 2 in the representation of the figure. As shown in this representation, an engagement base 8 is formed which is arranged above the platform 6 or located above it, which engagement base 8 can be fastened to a turbine casing in a manner not shown in any more detail. The engagement base 8 can be brought into engagement with an adjacent structural element so that a fastening of the turbine blade/vane 1 to a support body is made possible in a particularly simple manner. In this arrangement, the turbine blade/vane 1 is provided for use in the second gas turbine guide vane row, viewed in the flow direction of the working medium, so that the engagement base 8 is designed for suspension in a structural element at both the front end and the rear.

The turbine blade/vane 1 is configured for use in a spatial region of the gas turbine with a comparatively high thermal loading. For this purpose, on the one hand, consistent functional separation of the acceptance of thermal loading and mechanical loading on the turbine blade/vane 1 is provided by different structural parts. This is ensured by the separate arrangement of the platform 6 and the engagement base 8.

The platform 6 is, namely, used for the exclusive acceptance of the thermal loading emerging from the hot working medium flowing through the gas turbine without, in the process, the platform 6 being subjected to mechanical loads. The latter are, rather, accepted by the engagement base 8, which is structurally decoupled from the platform 6 but which, for its part, is only subjected to a comparatively small thermal loading due to the platform 6 connected in front of it. In order to additionally facilitate the use of the turbine blade/vane 1 in a thermally highly stressed spatial region, the turbine blade/vane 1 is also configured so that it can be cooled. For this purpose, the blade/vane aerofoil 2 is embodied in the manner of an internal profiling with a cavity 10, which makes it possible to conduct a coolant such as, for example, cooling air or cooling steam.

The platform 6 is embodied with a comparatively thin-walled platform floor 12, whose flat design acts essentially as a radiation shield for the thermal output emitted from the working medium flowing through the turbines. For a possible connection to surrounding structural elements, for example by engagement, and/or for stiffening in terms of a self-supporting mechanical stability, the platform 6 is embodied with a thickened rim or a rib arrangement. Further, for this purpose, it has an outer rim 14 which is thickened as compared with the platform floor 12. A so-called platform pocket in the manner of a depression therefore appears due to the outer rim 14 and the platform floor 12.

In order to make it comparatively easy to manufacture this platform pocket, even without the use of "lost inserts", the turbine blade/vane 1 is designed in such a way that, even while avoiding re-entrant interference with the engagement base 8 penetrating into the respective spatial region. Therefore, while bypassing the respective engagement base 8, it permits the reversible introduction of a mold part into the spatial region of the depression formed by the outer rim 14, together with the platform floor 12. In order to ensure that this can happen, the side wall 16 of the outer rim 14 facing toward the blade/vane center line 4 is slanted, viewed relative to the blade/vane center line 4. The angle $\alpha$ characteristic of this slant is selected to be more than 10° and less than 80°, namely approximately 45° in the exemplary embodiment.

In its floor region facing toward the platform floor 12, the outer rim therefore has a comparatively wide cross section, which becomes increasingly narrow in the direction toward its end 18 facing away from the platform floor 12. In precisely this upper end region, the outer rim 14 can be reliably cooled by relatively simple means and, in particular, while using only a limited quantity of coolant, because of the comparatively trivial amount of material. In order to permit such reliable cooling with only limited use of coolant even in its comparatively widely embodied lower region facing toward the platform floor 12, the outer rim 14 is provided, in this region, with a number of cooling holes 20 to which a coolant can be admitted. In their outlet region, these cooling holes open into a common cooling gap 22.

The turbine blade/vane 1 is designed so as to be capable of carrying high thermal loading with high mechanical strength. For this purpose, the turbine blade/vane 1 has a single-crystal embodiment. While maintaining the boundary conditions specified for this, the turbine blade/vane 1 is, for this purpose, manufactured by casting—using a casting system 30 only represented as excerpt in the figure. The casting system 30, which is essentially employed in the production of a wax model for the turbine blade/vane 1, comprises as its basic element a casting mold (not represented in any more detail). A number of shell elements can be positioned in this casting mold. In their totality, these shell elements leave free a cavity corresponding to the contour of the turbine blade/vane 1 to be manufactured. This cavity can be filled with pourable wax in a subsequent operational step.

Figure 1B:
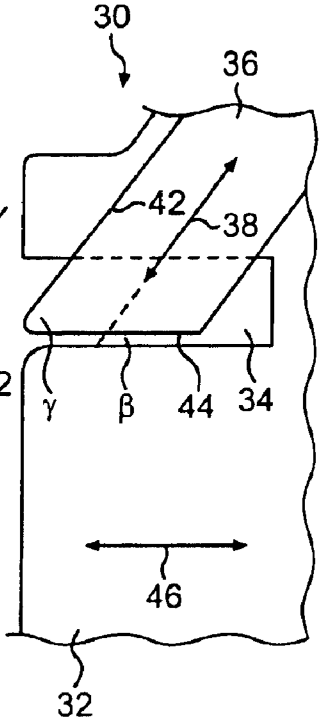
FIG. 1B illustrates a casting system in accordance with an exemplary embodiment of the present invention.

In addition to other elements necessary for providing the contour of the turbine blade/vane 1, the casting system 30 of FIG. 1B comprises, in particular, a first shell element 32, which can be employed in the manner of a peripheral slide. The first shell element 32 comprises, for this purpose and in addition to other mold elements which determine the structure, a recess 34 specifying the boundary surface of the platform floor 12.

For the final shaping of the platform 6, the first shell element 32 is complemented by a second shell element 36, which has an essentially flat configuration and is guided so that it can be displaced in the first shell element 32. In the casting position shown in the figure, the second shell element 36 protrudes into the recess 34 of the first shell element 32 in such a way that only a spatial region matched to the final shaping of the platform 6 is left free. This therefore specifies both the platform floor 12 and the outer rim 14 of the platform 6.

In order to permit the simple removal of the shell elements 32, 36 by simple displacement and without "lost inserts" after the casting of a wax model for the turbine blade/vane 1, the second shell element 36 is arranged so that it can be displaced in a tilted direction, indicated by the double arrow 38, by an angle β of approximately 45° relative to the boundary surface of the recess 34 specifying the platform floor 12. This permits removal of the second shell element 36 from the wax model of the turbine blade/vane 1 after it has been cast by simple displacement in the direction of the double arrow 38, without this being adversely affected by the engagement base 8. For this purpose, the engagement base 8 is dimensioned in its lateral extent in such a way that it does not adversely affect the spatial region for the second shell element 36 indicated by the line 40.

In order to permit the appropriate shaping of the platform 6 overall, the second shell element 36 has, in the embodiment example, an additional end surface 44 tilted relative to its basic surface 42 by an angle γ of approximately 45°, which end surface 44 forms, jointly with the recess 34 of the first shell element, a casting shell for the platform floor 12.

After the casting of the wax model for the turbine blade/vane 1 has been completed, the second shell element 36 can—due to this type of design and the interaction between the first shell element 32 and the second shell element 36—be removed first by simple displacement from the mold body which has appeared, without this being prevented by re-entrant interference with, for example, the engagement base 8. The first shell element 32 can subsequently be removed in the peripheral direction indicated by the double arrow 46, i.e. essentially parallel to the alignment of the platform floor 12. This permits reliable casting of the wax model of the turbine blade/vane 1 with the exclusive use of slides and without the use of "lost inserts" so that, in a particularly favorable manner, the manufacture of a single-crystal turbine blade/vane 1 is also made possible. In a manufacturing process of this type, the lug-type protrusion 50, for the platform 6 and bounding the platform pocket in the region of the blade/vane center line 4, can remain. This protrusion 50 can be used, in a particularly favorable manner, as a support or fixing device for an impingement cooling plate.

List of Designations

| | |
|---|---|
| 1 | Turbine blade/vane |
| 2 | Blade/vane aerofoil |
| 4 | Blade/vane center line |
| 6 | Platform |
| 8 | Engagement base |
| 10 | Cavity |
| 12 | Platform floor |
| 14 | Outer rim |
| 16 | Side wall |
| 18 | Remote end |
| 20 | Cooling holes |
| 22 | Cooling gap |
| 30 | Casting system |
| 32 | First shell element |
| 34 | Recess |
| 36 | Second shell element |
| 38 | Double arrow |
| 40 | Line |
| 42 | Basic surface |
| 44 | End surface |
| 46 | Double arrow |
| 50 | Protrusion |
| α, β, γ | Angles |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A casting system for manufacturing a turbine blade/vane including a blade/vane aerofoil and a platform, formed on an end region of the blade/vane aerofoil, the casting system comprising:

a first shell element, positionable in a casting mold and including a recess specifying a boundary surface of the platform floor; and a second shell element, including an essentially flat configuration, displaceable in a direction angled relative to the recess specifying the boundary surface.

2. The casting system as claimed in claim 1, wherein the second shell element includes an end surface angled relative to its base surface, the end surface forming, jointly with the recess of the first shell element, a casting shell for the platform floor.

3. A casting system for manufacturing a turbine blade/vane including a blade/vane aerofoil and a platform, formed on an end region of the blade/vane aerofoil, the casting system comprising:

a first shell element, positionable in a casting mold and including a recess specifying a boundary surface of the platform floor; and a second shell element, including an essentially flat configuration, guided so that it can be displaced in a direction tilted by an angle of more than 10° and less than 80° relative to the recess specifying the boundary surface.

4. The casting system as claimed in claim 3, wherein the second shell element includes an end surface tilted by an angle of more than 10° and less than 80° relative to its base surface, the end surface forming, jointly with the recess of the first shell element, a casting shell for the platform floor.

5. A turbine blade/vane, comprising:

a profiled blade/vane aerofoil, extending along a blade/vane center line;

a platform, formed on an end region of the blade/vane aerofoil, extending transverse to the blade/vane center line, the platform including, an outer rim which is relatively thicker than a platform floor, a side wall of the outer rim facing toward the blade/vane center line being angled relative to the blade/vane center line; and an engagement base, formed on the aerofoil of the turbine blade/vane in the end region above the platform;

wherein the side wall of the outer rim is angled so a casting operation used to form said angled side wall of said outer rim is performable without contacting the engagement base; and wherein the turbine blade/vane is manufacturable using a casting system that includes a first shell element, positionable in a casting mold and including a recess specifying a boundary surface of the platform floor, and a second shell element, including an essentially flat configuration, guided so that it can be displaced in a direction tilted by an angle of more than 10° and less than 80° relative to the recess specifying the boundary surface.

6. A turbine blade/vane, comprising:

a profiled blade/vane aerofoil, extending along a blade/vane center line;

a platform, formed on an end region of the blade/vane aerofoil, extending transverse to the blade/vane center line, the platform including, an outer rim which is thickened in comparison with a platform floor, a side wall of the outer rim facing toward the blade/vane center line being slanted relative to the blade/vane center line; and an engagement base, formed on the aerofoil of the turbine blade/vane in the end region above the platform;

wherein the turbine blade/vane is of a single crystal type; and wherein the turbine blade/vane is manufacturable using a casting system that includes a first shell element, positionable in a casting mold and including a recess specifying a boundary surface of the platform floor, and a second shell element, including an essentially flat configuration, guided so that it can be displaced in a direction tilted by an angle of more than 10° and less than 80° relative to the recess specifying the boundary surface.

7. The turbine blade/vane as claimed in claim 1, wherein the outer rim of the platform includes a number of cooling holes in its floor region.

8. The turbine blade/vane as claimed in claim 7, wherein the cooling holes open, at their outlet end, into a common cooling gap.

9. The turbine blade/vane as claimed in claim 8, wherein the turbine blade/vane is configured as a guide vane for a gas turbine.

10. The turbine blade/vane as claimed in claim 8, wherein the turbine blade/vane is configured as a guide vane for a stationary gas turbine.

11. The turbine blade/vane as claimed in claim 7, wherein the turbine blade/vane is configured as a guide vane for a gas turbine.

12. The turbine blade/vane as claimed in claim 7, wherein the turbine blade/vane is configured as a guide vane for a stationary gas turbine.

13. The turbine blade/vane as claimed in claim 1, wherein the second shell element includes an end surface tilted by an angle of more than 10° and less than 80° relative to its base surface, the end surface forming, jointly with the recess of the first shell element, a casting shell for the platform floor.

14. The turbine blade/vane as claimed in claim 6, wherein the turbine blade/vane is configured as a guide vane for a stationary gas turbine.

* * * * *